(12) United States Patent
Hempelmann et al.

(10) Patent No.: US 7,866,266 B2
(45) Date of Patent: Jan. 11, 2011

(54) MAGNETIC LEVITATION TRAIN PROVIDED WITH A COMPRESSED AIR SUPPLY UNIT

(75) Inventors: Axel Hempelmann, Munich (DE); Siegbert Kunz, Miesbach (DE)

(73) Assignee: ThyssenKrupp Transrapid GmbH, Kassel (DE)

(*) Notice: Subject to any disclaimer, the term of this patent is extended or adjusted under 35 U.S.C. 154(b) by 100 days.

(21) Appl. No.: 10/592,815

(22) PCT Filed: Mar. 10, 2005

(86) PCT No.: PCT/DE2005/000420
§ 371 (c)(1),
(2), (4) Date: Jul. 2, 2008

(87) PCT Pub. No.: WO2005/090135
PCT Pub. Date: Sep. 29, 2005

(65) Prior Publication Data
US 2008/0252138 A1    Oct. 16, 2008

(30) Foreign Application Priority Data
Mar. 19, 2004    (DE) .................. 10 2004 014 037

(51) Int. Cl.
*B60L 13/04* (2006.01)

(52) U.S. Cl. .......................... 104/281; 104/282; 303/8; 303/10; 303/127; 303/128

(58) Field of Classification Search .......... 104/281, 104/282, 284; 303/8, 10, 7, 127, 128
See application file for complete search history.

(56) References Cited

U.S. PATENT DOCUMENTS

| 2,183,303 | A | * | 12/1939 | Campbell | 303/30 |
|---|---|---|---|---|---|
| 2,989,350 | A | * | 6/1961 | Nelson | 303/86 |
| 4,266,485 | A | * | 5/1981 | Bruner et al. | 105/61 |
| 4,698,895 | A | * | 10/1987 | Miller et al. | 29/464 |
| 4,954,798 | A | * | 9/1990 | Kasahara et al. | 335/161 |
| 5,808,370 | A | * | 9/1998 | Bezos | 307/9.1 |
| 5,927,822 | A | * | 7/1999 | Hart | 303/7 |
| 6,546,318 | B2 | * | 4/2003 | Barberis et al. | 701/20 |
| 6,629,358 | B2 | * | 10/2003 | Setiabudi et al. | 29/609 |
| 6,991,301 | B2 | * | 1/2006 | Aurich et al. | 303/15 |
| 6,997,520 | B1 | * | 2/2006 | Barberis et al. | 303/3 |
| 7,314,008 | B2 | * | 1/2008 | Li | 104/281 |
| 7,334,849 | B2 | * | 2/2008 | Barberis et al. | 303/128 |
| 7,350,879 | B2 | * | 4/2008 | Nilsson et al. | 303/20 |
| 2001/0037167 | A1 | * | 11/2001 | Barberis et al. | 701/19 |
| 2004/0046442 | A1 | * | 3/2004 | Aurich et al. | 303/7 |
| 2005/0134113 | A1 | * | 6/2005 | Ring | 303/128 |
| 2008/0252138 | A1 | * | 10/2008 | Hempelmann et al. | 303/8 |

FOREIGN PATENT DOCUMENTS

| DE | 1 096 949 | 1/1961 |
|---|---|---|
| DE | 38 28 277 | 3/1989 |
| WO | 97/30504 | 8/1997 |

* cited by examiner

*Primary Examiner*—S. Joseph Morano
*Assistant Examiner*—Jason C Smith
(74) *Attorney, Agent, or Firm*—Michael J. Striker

(57) ABSTRACT

A magnetic levitation railways has at least one vehicle, a compressed air supply unit provided in the vehicle and at least one consumer connection line, the compressed air supply unit has at least two compressed air lines laid in the vehicle and connected to at least one compressed air source each, and the consumer connection line can be connected to one another of the compressed air lines.

17 Claims, 2 Drawing Sheets

MAGNETIC LEVITATION TRAIN PROVIDED WITH A COMPRESSED AIR SUPPLY UNIT

CROSS-REFERENCE TO RELATED APPLICATION

DE 10 2004 014 037.5 Mar. 19, 2004

The present invention relates to a magnetic levitation train.

For magnetic levitation trains of this type, each individual vehicle, which is also designated as vehicle section, is generally provided with a compressed air supply unit serving to supply compressed air to various facilities, e.g. pneumatic springs, door drives, air conditioning equipment, or the like. If one of the compressed air supply units fails to work, the vehicle concerned receives no compressed air. If two compressed air supply units per vehicle are provided for avoiding this disadvantage and for reasons of redundancy, the expenditure on cost and assembly is substantial.

Corresponding problems result if a continuous compressed air line is installed in each vehicle, wherein said lines are connected to a compressed air supply unit and will also be interconnected when two vehicles are coupled together. If this compressed air line becomes defective, the whole train will receive no compressed air.

SUMMARY OF THE INVENTION

The technical problem to be solved by the present invention lies in that a compressed air supply unit is to be provided for magnetic levitation trains of the above mentioned species in such a manner that it ensures high redundancy at relatively low expenditure on design and installation.

In keeping with these objects and with others which will become apparent hereinafter, one feature of the present invention resides, briefly stated in a magnetic levitation train, comprising a plurality of vehicles; compressed air supply units provided n the vehicles; and at least one consumer connection line in every vehicle, wherein each of said compressed air supply units has at least two compressed air lines which in a coupled status of said vehicles are connected to form compressed air strands, wherein each of said compressed air strands is connected to at least one compressed air source, and wherein said consumer connection lines are selectively connectable to one or another of said compressed air strands.

The present invention bears the advantage that each vehicle is provided with two continuous compressed air lines to which the consumers can be optionally connected to. Thus it becomes possible to connect consumers on failure of one compressed air line to the other compressed air line that has not become defective.

Other advantageous features of the present invention become evident from the sub-claims.

The present invention will be explained in more detail hereinbelow by means of an embodiment and based upon the drawings attached hereto, wherein:

DESCRIPTION OF THE PREFERRED EMBODIMENTS

Figure 1:
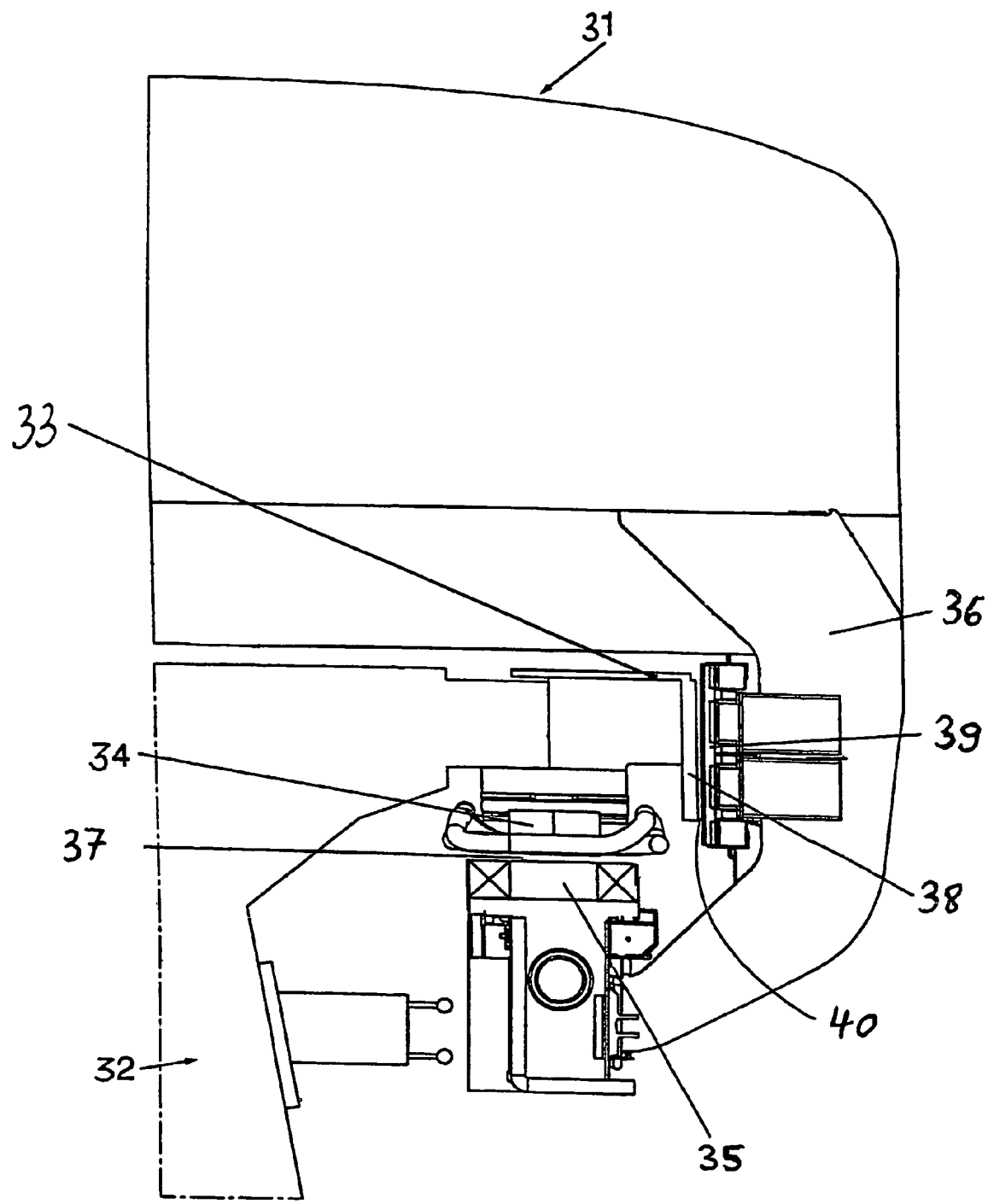
FIG. 1 schematically shows a partial section through a usual magnetic levitation railway and a driveway associated therewith.

FIG. 1 schematically shows a cross-section through a magnetic levitation vehicle 31 which is conventionally movably mounted on a guideway extending in longitudinal direction of a route, said guideway being comprised of supports 32 made of steel and/or concrete as well as guideway plates 33 mounted on it. The propulsion of the magnetic levitation vehicle 31 is effected, for example, by means of a long stator motor which comprises stator packets 34 affixed underneath said guideway plates 33 and arranged consecutively in the longitudinal direction thereof. The stator packets 34 have alternatingly succeeding teeth and grooves, not shown here, into which windings are inserted that are fed with three-phase current of a variable amplitude and frequency. The actual excitation field of the long stator motor is generated by at least one first magnet arrangement acting as carrying magnet 35 which is affixed by at least one lateral support bracket 36 to said magnetic levitation vehicle 31 and which has magnet poles facing the downwardly open grooves of stator packets 34 as shown in FIG. 1. The carrying magnet 35 not only provides the excitation field, but also fulfils the function of carrying and levitating by maintaining a given gap 37 of e.g. 10 mm between said carrying magnet 35 and said guideway or its stator packets 34 during operation of the magnetic levitation vehicle 31.

For a proper guidance of the magnetic levitation vehicle 31 on the track, the guideway plates 33 are provided with laterally affixed guide rails 38, which are faced by guiding magnets 39 also mounted to the support brackets 36 and serving for maintaining a gap 40 corresponding to gap 37 between themselves and the guiding rail 38 during operation of the vehicle.

Magnetic levitation vehicles 31 and their magnet arrangements are generally known to an expert, e.g. through printed publications U.S. Pat. No. 4,698,895, DE 39 28 277 A1, and PCT WO 97/30504 A1, which for the sake of simplicity are made a part of the present disclosure by reference.

Figure 2:
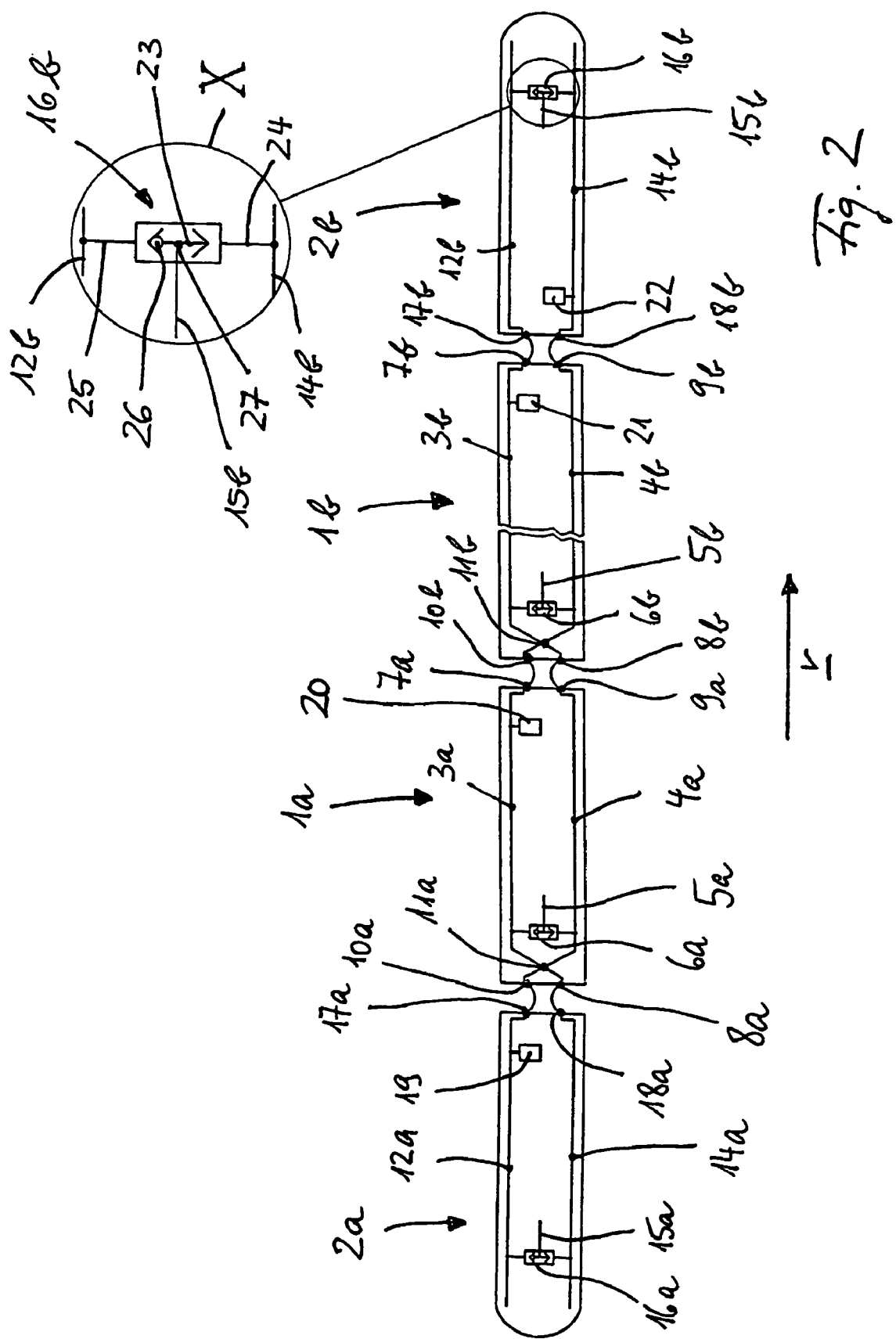
FIG. 2 shows a magnetic levitation train composed of four vehicles and/or sections in a schematic top view.

FIG. 2 shows an embodiment of the invention considered best at present. Accordingly a magnetic levitation railway is shown having two middle vehicles 1a and 1b as well as two end-side vehicles 2a and 2b, wherein all these four vehicles 1,2 are interconnected to form a train.

The vehicle 1a contains a compressed air supply unit provided with two compressed air lines 3a and 4a which extend in longitudinal direction of the magnetic levitation railway through the vehicle 1a. Furthermore, the vehicle 1a contains a consumer connection line 5a with which at least one consumer not shown here in detail, e.g. an air conditioning unit, can be connected. The arrangement according to the invention has been so chosen that the connection line 5a can optionally be connected with the compressed air line 3a or with the compressed air line 4a. The choice of the relevant compressed air line 3a, 4a, is preferably taken by utilizing a selector valve 6a which is switched between the connection line 5a and the two compressed air lines 3a, 4a.

Preferably an automatically working selector switch 6a is provided which connects the connection line 5a for example permanently with that line of the two compressed air lines 3a, 4a which currently has the higher air pressure.

The compressed air line 3a leads to a compressed air connection 7a at one end of the vehicle it and leads to a compressed air connection 8a at the other end of the vehicle.

Accordingly, the compressed air line 4a leads to a compressed air connection 9a at one end of the vehicle and to a compressed air connection 10a at the other end of the vehicle. The connection 7a, for example, lies on the left side of the vehicle, whereas the connection 9a lies on the right side of the vehicle if viewed in the direction of travel marked by an arrow v. In contrast therewith, the situation at the other end of the vehicle is vice versa, i.e. the connection 8a belonging to the compressed air line 3a lies on the right side of the vehicle, whereas the connection 10a belonging to the compressed air line 4a lies on the left side of the vehicle. That means that the two compressed air lines 3a and 4a cross each other anywhere in the vehicle 1a as is indicated by a crossing point designated with reference number 11.

The arrangement of vehicle 1b is expediently the same as that for vehicle 1a. The corresponding parts are therefore designated with the same reference numbers, but additionally with letters b instead of letters a.

By analogy to the vehicle 1, the end-side vehicle 2a has two compressed air lines 12a and 14a, a consumer connection line 15a, and a selector valve 16a that connects the connection line 15a with the two compressed air lines 12a, 14a. In its function, the selector valve 16a corresponds to the selector valves 6a and 6b, respectively.

At the vehicle end facing the vehicle 1a, a compressed air connection 17a for the compressed air line 12a lies on the left side, whereas a compressed air connection 18a for the compressed air line 14a lies on the right side. The way in which the compressed air lines 12a, 14a are laid in the direction of the other end in the vehicle 2a is irrelevant for the present invention. It is only important that both compressed air lines 12a, 14a are shut-off at their ends lying remote from the connections 17a, 18a.

Finally, the vehicle 2b has the same configuration as vehicle 2a. The corresponding parts are therefore designated with the same reference numbers, but additionally with letters b instead of letters a. In contrast with the vehicles 1a, 1b, the two vehicles 2a, 2b are mirror-symmetrically arranged in the train, i.e. in an arrangement turned by 180° to each other, so that the compressed air connections 17b, 18b are mounted at the end of vehicle 2b that faces the vehicle 1b.

In a status in which the four vehicles are coupled to each other as shown in FIG. 2, the connections 10a, 17a and/or 8a, 18a, and furthermore 7a, 10b and/or 9a, 8b, and 7b, 17b and/or 9b, 18b are interconnected in terms of flow by connection means that are generally known for magnetic levitation railways and other vehicles. Therefore, the compressed air lines 12a, 4a, 3b and 12b on the one hand as well as the compressed air lines 14a, 3a, 4b, and 14b on the other hand constitute a compressed air strand and/or flow channel formed for example by a suitable pressure air hose, an aluminum pipe or the like.

As shown in the drawing, each vehicle has its own compressed air source 19 to 22 in form of an active compressed air generator, e.g. a compressor, mounted in itself and working at an operating pressure of 10 bar, for example. The compressed air generator 19 is connected with the line 12a, the compressed air generator 20 is connected with the line 3a, the compressed air generator 21 is connected with the line 3b, and finally the compressed air generator 22 is connected with the compressed air line 14b. Thereof, it follows that each compressed air strand of the train has one of these compressed air generators 19 to 22 in each vehicle 1a to 2b, to be true, but if viewed from left to right in FIG. 2, the generators 19 to 22 are alternately connected with the one and/or the other continuous compressed air strand. Therefore, the one compressed air lines 3a, 3b of the middle (inner) vehicles 1a, 1b are for example fed by a compressed air source 20, 21 mounted in the relevant vehicle itself, whereas the other compressed air lines 4a, 4b of the vehicles 1 are connected with a compressed air source that consists of one of the connections 17a, 8b, and/or 7a, 18b, etc. of a neighbouring vehicle 2a, 1b and/or 1a, 2b.

The compressed air supply unit as described hereinabove offers numerous advantages.

To begin with, one compressed air strand 12a, 4a, 3b, 12b or 14a, 3a, 4b, 14b may entirely fail to work, without this leaving any of the vehicles 1, 2 concerned without compressed air, because the consumers are then simply switched over to the compressed air strand which is still working. To this extent, redundancy is established for all vehicles involved.

Furthermore, it is advantageous that all the middle and all the end-side vehicles 1 and 2, respectively, can be of an identical design and construction. With the middle vehicles 1, the selector switches 6a, 6b for example are mounted in the rear section of the vehicle, while the compressed air generators 20, 21 are arranged in the front section of the vehicle, as shown in FIG. 2. Therefore, there are no differences at all with regard to the supply of compressed air, no matter in which sequence these vehicles 1 are connected with each other. The same applies to the end-side vehicles 2 which because of their being coupled to the front and/or rear end of the train are utilized in positions turned by 180° relatively to each other.

Another quite substantial advantage of the invention lies in the redundancy of the various compressed air generators. Even in case that a compressed air generator (e.g. 21) in a compressed air strand (e.g. 12a, 4a, 3b, 12b) fails to work, this strand is nevertheless supplied with compressed air by one of the other compressed air generators (e.g. 19).

Finally, even a drop in compressed air in one of the two compressed air strands does not involve a direct disadvantage for the consumers. The selector switches 6a, 6b, 16a, 16b can in principle be manually operable, but preferably they are so designed and/or installed that they connect the consumer connection lines 5a, 5b, 15a, and 15b automatically with the compressed air strand that currently offers the higher air pressure.

An embodiment for such a selector valve is illustrated in the enlarged view X of FIG. 2 based upon selector valve 16b. This is comprised of a so-called changeover valve which has a compressed air passage 23 with compressed air connections 24, 25 being connected to the compressed air lines 12b, 14b and designed like valve seats, in between of which a ball 26 is mounted in an arrangement allowing for moving it to and fro. The consumer connection line 15b is connected to a middle branch 27 of the passage 23, and the ball 26 can shut-off one of the two connections 24, 25 each.

The selector switch 16b is designed and built like a double-acting non-return valve.

Its working mode is as follows:

If the compressed air line 14b currently is at a pressure higher than that of the compressed air line 12b, then the ball 26 is automatically pressed to the connection 25, so that it shuts it off as shown in FIG. 2. The consumer connection line 15b is then connected via the branch 27 to the compressed air line 14b. However, if the pressure in the line 14b falls under the pressure in the line 12b at any moment, then the ball 26 is laid against the connection 24, thus automatically connecting the consumer connection line 15b via branch 27 to the line 12b which carries the higher pressure. The consumers are thereby permanently supplied with the currently highest air pressure, no matter whether it still corresponds to the operating pressure of e.g. 10 bar or to a lower pressure.

The other selector switches 6a, 6b and 16a are designed and built in the same way as the selector switch 16b.

The invention is not limited to the described embodiment that can be diversified in a plurality of ways. To begin with this applies to the position of the crossing points 11a, 11b and to the compressed air lines 3a and 3b in the vehicles 1a and 1b.

Furthermore, the compressed air lines 3a, 4a, etc. need not run along the sides of the vehicles 1a etc., but in principle they may be laid at any points and also be laid one above the other like the connections 7a to 10a, etc. The same applies to the compressed air connections 7 to 10 and/or 17 and 18 which expediently are mounted at the same distance to each other and in a way that they can be easily or even automatically connected to each other when the vehicles 1, 2 are coupled.

Furthermore, the crossing points 11a, 11b are only shown systematically. In fact, the pertinent compressed air lines 3a, 4a, etc. can be crossed several times, i.e. in case of vehicles 1 with an odd number and in case of vehicles 2 with an even number of crossing points. The term "crossing" as applied within the scope of this invention shall mean that the lines 3,4 are arranged at the relevant ends of the vehicle in opposite direction to the relevant other ends of the vehicle in order to automatically achieve the effect outlined hereinabove. Moreover, to increase redundancy, further compressed air lines and pertinent components can be provided. Furthermore, it is self-evident that in case the magnetic levitation railway is only operated with one of the vehicles 1 and/or 2, an additional compressed air source would have to be connected to the relevant compressed air line which is not linked to one of the compressed air generators 19 to 22 mounted in the vehicle itself as shown in FIG. 2 in order to obtain the desired redundancy. Finally it is self-explanatory that the different materials can also be applied in combinations other than those described and shown hereinabove.

The invention claimed is:

1. A magnetic levitation train, comprising a plurality of vehicles arranged one after another in a longitudinal direction; compressed air supply units provided in the vehicles; and a plurality of consumer connection lines distributed over the magnetic levitation train with at least one consumer connection line in every vehicle, wherein each of said compressed air supply units has at least two compressed air lines which in a coupled status of said vehicles are connected to form respectively at least two independent compressed air strands each extending over all vehicles of the magnetic levitation train, wherein each of said compressed air strands is connected to at least one compressed air source, and wherein said consumer connection lines are selectively connectable directly to one or another of said compressed air strands in such a manner that on failure of one of said compressed air strands said consumer connection lines can be supplied with compressed air by another of said compressed air strands and wherein each vehicle comprises only one compressed air supply unit which is connected to one of said strands so that at least two vehicles are provided to supply said at least two independent compressed air strands.

2. A magnetic levitation railway according to claim 1, wherein said vehicle (1) at a front and rear end has two compressed air connections (7 to 10) each that are connected to one of the compressed air lines (3, 4) each.

3. A magnetic levitation railway according to claim 2, wherein the compressed air lines (3, 4) cross each other transversely to the longitudinal direction between the front and rear end.

4. A magnetic levitation railway according to claim 3, wherein a compressed air generator acting as compressed air source (19 to 22) is provided in each vehicle (1, 2).

5. A magnetic levitation railway according to claim 2, wherein the compressed air connections (7 to 10) are mounted at both ends at the same points and at the same distance.

6. A magnetic levitation railway according to claim 1, with at least one middle vehicle (1a, 1b) and two end-side vehicles (2a, 2b) coupled to it, wherein the compressed air lines (3, 4) within the middle vehicle (1a, 1b) cross each other between the front and rear end.

7. A magnetic levitation railway according to claim 6, wherein the compressed air lines (12, 14) within the end-side vehicles (2a, 2b) are laid without crossing points.

8. A magnetic levitation railway according to claim 6, wherein the end-side vehicle (2) is provided only at one end with two compressed air connections (17, 18) which are connected to one compressed air line (12, 14) each.

9. A magnetic levitation railway according to claim 6, wherein the compressed air lines (3, 4) cross each other so that in the middle vehicle at the front and rear ends the compressed air lines are located opposite to one another as considered transversely to the longitudinal direction.

10. A magnetic levitation railway as defined in claim 6, wherein a crossing of the compressed air lines, said consumer connection lines, and a valve for selectively connecting said consumer connection lines to one or another of said compressed air strands are located at one end of the middle vehicle, while the air supply unit is located at another opposite end of the middle vehicle.

11. A magnetic levitation railway according to claim 1, wherein it has at least two middle and two end-side vehicles (1, 2), wherein the compressed air lines (3, 4) in all middle vehicles (1) are crossing transversely to the longitudinal direction between the front and rear ends, whereas in a front and a rear vehicle (2) of said end-side vehicles they are not crossing.

12. A magnetic levitation railway according to claim 1, wherein the middle and end-side vehicles (1, 2) are identical among each other in design and construction with regard to the position of the compressed air lines (3, 4 and/or 12, 14), compressed air generators (19 to 22), consumer connection lines (5, 15) and selector valves (6, 16).

13. A magnetic levitation railway according to claim 1, wherein in each vehicle (1, 2) one of the compressed air sources is formed by a compressed air generator mounted in the same vehicle (1, 2) whereas the other compressed air source is formed by at least one compressed air connection (7 to 10, 17, 18) of a neighboring vehicle.

14. A magnetic levitation railway according to claim 1, further comprising selector valves, wherein said consumer connection lines are connected to said selector valves which are connected to both of said at least two compressed air strands.

15. A magnetic levitation railway according to claim 14, wherein the selector valves (6, 16) are designed and built in the way of double-acting non-return valves.

16. A magnetic levitation railway according to 14, wherein said consumer connection lines are automatically and selectively connected by said selector valves to that compressed air strand which is currently at a higher pressure level.

17. A magnetic levitation railway as defined in claim 1, wherein in each of the vehicles the consumer connection line and a selector valve for connecting the consumer connection line to said compressed air strands is located at one end, while said compressed air source is located at another opposite end of the same vehicle.

* * * * *